(12) United States Patent
Cho et al.

(10) Patent No.: US 8,315,208 B2
(45) Date of Patent: Nov. 20, 2012

(54) APPARATUS AND METHOD FOR DETECTING FEMTO BASE STATION IN WIRELESS COMMUNICATION SYSTEM

(75) Inventors: Jae-Hee Cho, Seoul (KR); Byung-Wook Jun, Seoul (KR); Jin-Hee Won, Suwon-si (KR); Yung-Soo Kim, Seongnam-si (KR); Jong-Hyung Kwun, Seoul (KR); Ju-Mi Lee, Seoul (KR); Young-Bo Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 12/756,458

(22) Filed: Apr. 8, 2010

(65) Prior Publication Data

US 2010/0260052 A1 Oct. 14, 2010

(30) Foreign Application Priority Data

Apr. 10, 2009 (KR) ........................ 10-2009-0031134

(51) Int. Cl.
*H04W 4/00* (2009.01)
*H04L 12/28* (2006.01)
*H04W 36/00* (2009.01)
*H04W 40/00* (2009.01)

(52) U.S. Cl. ......... 370/328; 370/254; 455/444; 455/449
(58) Field of Classification Search .................. None
See application file for complete search history.

(56) References Cited

U.S. PATENT DOCUMENTS

| | | | |
|---|---|---|---|
| 2007/0097939 A1 | 5/2007 | Nylander et al. | |
| 2007/0254620 A1 | 11/2007 | Lindqvist et al. | |
| 2009/0285113 A1* | 11/2009 | Yavuz et al. | 370/252 |
| 2009/0286545 A1* | 11/2009 | Yavuz et al. | 455/452.1 |
| 2009/0310568 A1* | 12/2009 | Chen et al. | 370/332 |
| 2009/0312024 A1* | 12/2009 | Chen et al. | 455/437 |
| 2011/0223923 A1* | 9/2011 | Cho et al. | 455/448 |
| 2011/0299446 A1* | 12/2011 | Chun et al. | 370/311 |

FOREIGN PATENT DOCUMENTS

| KR | 10-2008-0045096 A | 5/2008 |
|---|---|---|
| WO | 2007/040454 A2 | 4/2007 |

* cited by examiner

*Primary Examiner* — Clemence Han
(74) *Attorney, Agent, or Firm* — Jefferson IP Law, LLP

(57) ABSTRACT

An apparatus and a method for detecting a femto Base Station (BS) of a Mobile Station (MS) in a wireless communication system including a macro BS and a femto BS are provided. The method includes receiving a request, from the macro BS, to monitor an UpLink (UL) signal of an MS permissible by the femto BS to access, and monitoring the UL signal of the MS permissible to access.

25 Claims, 10 Drawing Sheets

APPARATUS AND METHOD FOR DETECTING FEMTO BASE STATION IN WIRELESS COMMUNICATION SYSTEM

PRIORITY

This application claims the benefit under 35 U.S.C. §119(a) of a Korean patent application filed in the Korean Intellectual Property Office on Apr. 10, 2009, and assigned Serial No. 10-2009-0031134, the entire disclosure of which is hereby incorporated by reference.

BACKGROUND OF THE INVENTION

1. Field of the Invention

The present invention relates to an apparatus and a method for detecting a femto Base Station (BS) in a wireless communication system. More particularly, the present invention relates to an apparatus and a method for detecting a neighbor femto BS of a Mobile Station (MS) through UpLink (UL) monitoring of the femto BS with respect to the MS in a wireless communication system including a macro BS and a femto BS.

2. Description of the Related Art

In current high rate mobile communications, many wireless communication technologies are suggested as candidates. Among the wireless communication technologies, an Orthogonal Frequency Division Multiplexing (OFDM) technology is acknowledged as the most dominant next-generation wireless communication technology. In the future, it is expected that the OFDM technology will be used in most of the wireless communications. Wireless Metropolitan Area Network (WMAN) of the Institute of Electrical and Electronics Engineers (IEEE) standard 802.16 called 3.5-generation technology is adopting the OFDM technology as its standard.

The OFDM scheme transmits data using a multi-carrier. The OFDM scheme is one of a Multi Carrier Modulation (MCM) scheme which converts an input serial symbol stream in parallel, modulates the input serial symbol stream to orthogonal subcarriers, that is, to subchannels, and then transmits the subchannels.

In a cellular wireless communication system, when channel status is deteriorated because of a geographical condition in a cell, a distance between a Mobile Station (MS) and a Base Station (BS), or movement of the MS, the MS and the BS may not normally communicate with each other. For example, even in a service coverage of the BS, a building such as an office or a house forms a shadow zone. When the MS travels in the shadow zone, the BS cannot normally communicate with the MS because of a poor channel status with the MS.

In this respect, the wireless communication system provides a femto-cell service to address the service problem in the shadow zone and to offer a high-rate data service. The femto-cell is a small cell formed by a compact BS, which is installed indoors such as in an office or in a house, to connect to a mobile communication core network over a broadband network. The compact BS, which is a low-power BS installed by a user, can also be called a micro BS, a self-configurable BS, an indoor BS, a home BS, and a femto BS. Hereinafter, the compact BS is referred to as the femto BS.

Meanwhile, when the MS transits from a serving BS which services the MS to a coverage of another neighbor BS, the MS hands over for providing continuous service. Accordingly, it is necessary to select a handover target BS. The IEEE standard 802.16e system considers a scheme in which the MS receives a neighbor BS list from its serving BS through broadcast information and selects the handover target BS by searching neighbor BSs using the neighbor BS list. A 3rd Generation Partnership Project (3GPP) Long Term Evolution (LTE) system deliberates on a scheme in which the MS selects the handover target BS by scanning an entire preamble without a separate neighbor BS list.

When a macro BS and a femto BS coexist, a number of the BSs per unit area can abruptly increase, compared to an area including only macro BSs. When the macro BS broadcasts the neighbor BS list with respect to every femto BS in the macro cell to provide information of the neighbor femto BSs to the MS, excessive waste of radio resources is resulted. However, when the neighbor BS list of the neighbor femto BSs is not provided to the MS, the MS needs to detect the neighbor femto BS by scanning every preamble in every Frequency Allocation (FA). This process requires a lot of computation and a considerable amount of time scanning. Due to a delay of data transmission during the scanning of every preamble in every FA, a real-time service is difficult to provide.

Thus, a need exists for an apparatus and method for minimizing unnecessary scanning when an MS scans to detect a neighbor femto BS in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for detecting a neighbor femto Base Station (BS) of a Mobile Station (MS) in a wireless communication system including a macro BS and a femto BS.

Another aspect of the present invention is to provide an apparatus and a method for detecting a neighbor femto BS of an MS through UpLink (UL) monitoring of the femto BS with respect to the MS in a wireless communication system including a macro BS and a femto BS.

Yet another aspect of the present invention is to provide an apparatus and a method for detecting a neighbor femto BS of an MS such that a macro BS controls UL monitoring of a femto BS, the femto BS monitors an UL signal of the MS under control and reports the UL monitoring result to the macro BS, the macro BS requests the MS to scan according to the report, and the MS scans the femto BS according to the request in a wireless communication system including a macro BS and a femto BS.

Still another aspect of the present invention is to provide an apparatus and a method for detecting a neighbor femto BS of an MS such that a macro BS requests UL monitoring to a femto BS, the femto BS monitors an UL signal of the MS under control and reports the UL monitoring result to the macro BS, the macro BS requests the MS to scan according to the report, and the MS scans at an effective time according to the request in a wireless communication system including a macro BS and a femto BS.

A further aspect of the present invention is to provide an apparatus and a method for MSs in a macro cell to detect a neighbor femto BS such that a macro BS transmits UL monitoring configuration information to all lower femto BSs, the femto BS monitors a UL monitoring header of every MS accessible in a UL monitoring interval using the UL monitoring configuration information and reports the UL monitoring result to the macro BS, the macro BS requests the MSs in the macro cell to scan according to the report, and the MSs scan at an effective time according to the request in a wireless communication system including a macro BS and a femto BS.

In accordance with an aspect of the present invention, an operating method of a femto Base Station (BS) to support a Mobile Station (MS) for detecting the femto BS in a wireless communication system comprising a macro BS and the femto BS is provided. The method includes receiving a request, from the macro BS, to monitor an UpLink (UL) signal of an MS permissible by the femto BS to access, and monitoring the UL signal of the MS permissible to access.

In accordance with another aspect of the present invention, an operating method of a macro BS to support an MS for detecting a femto BS in a wireless communication system comprising the macro BS and the femto BS is provided. The method includes requesting to monitor a UL signal of the MS permissible by the femto BS to access, to the femto BS, and receiving a UL monitoring report message reporting of success or failure of the monitoring of the MS, from the femto BS.

In accordance with yet another aspect of the present invention, an apparatus supporting an MS for detecting a femto BS in a wireless communication system is provided. The apparatus includes a macro BS for requesting the femto BS to monitor a UL signal of an MS permissible by the femto BS to access, and the femto BS for monitoring the UL signal of the MS permissible to access.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
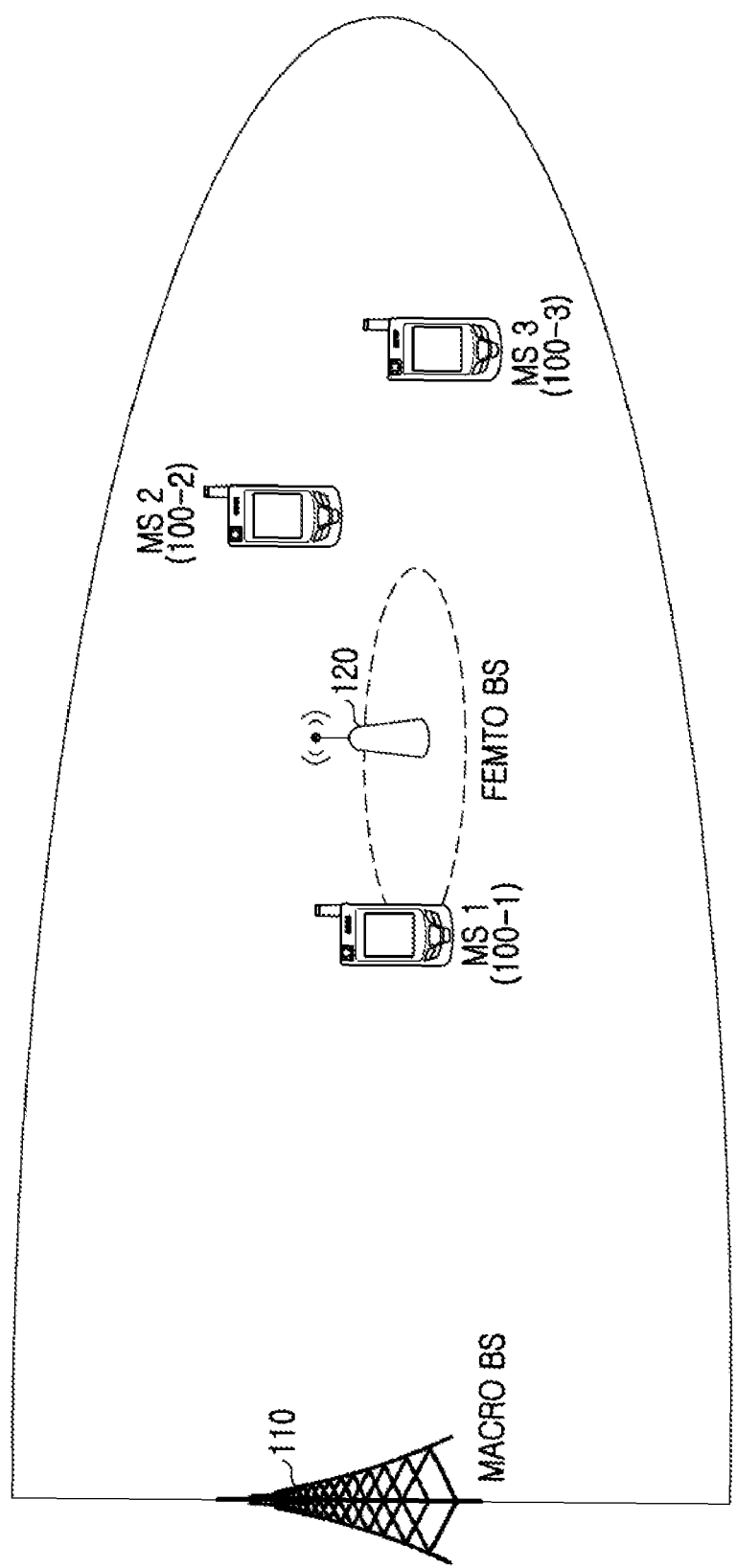
FIG. 1 is a diagram of a wireless communication system including a macro BS and a femto BS according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for detecting a neighbor femto Base Station (BS) of a Mobile Station (MS) in a wireless communication system including a macro BS and a femto BS. The femto BS of the MS is detected through UpLink (UL) monitoring of the femto BS in relation to the MS. More particularly, exemplary embodiments of the present invention provide a neighbor femto BS detecting apparatus and method for minimizing unnecessary scanning in a manner that, when the MS scans to detect the neighbor femto BS, the macro BS controls the UL monitoring of the femto BS, the femto BS monitors a UL signal of the MS, the femto BS reports the UL monitoring result to the macro BS, the macro BS requests the MS to scan, and the MS scans femto BSs.

Hereinafter, the wireless communication system adopts an Orthogonal Frequency Division Multiplexing (OFDM) scheme or an Orthogonal Frequency Division Multiple Access (OFDMA) scheme by way of example. While a broadband wireless access communication system using a multi-carrier is exemplified, exemplary embodiments of the present invention may be applied to other wireless communication systems including a compact BS (i.e., a femto BS).

FIG. 1 is a diagram of a wireless communication system including a macro BS and a femto BS according to an exemplary embodiment of the present invention.

Referring to FIG. 1, the wireless communication system includes MSs 100-1, 100-2 and 100-3, a macro BS 110, and a femto BS 120. The wireless communication system may further include a higher entity which manages the femto BS 120. For convenience, it is assumed herein that the macro BS 110 operates in Frequency Allocation (FA)1, that is, communicates using the FA1, and the femto BS 120 operates in FA2. The femto BS 120 is assumed herein to be hierarchically subordinate to the macro BS 110. Herein, the femto BS 120 may be an Open Subscriber Group (OSG) femto BS which allows access of every MS which enters a femto cell, or a Closed Subscriber Group (CSG) femto BS which allows access of only subscriber MSs.

The macro BS 110 controls UL monitoring of the femto BS 120. When the femto BS 120 reports the UL monitoring result of the MSs 100-1, 100-2 and 100-3 under the control, the macro BS 110 requests the MSs 100-1, 100-2 and 100-3 to scan the femto BS 120 reporting the success of the UL monitoring.

The femto BS 120 monitors the UL signals of the MSs 100-1, 100-2 and 100-3 under the control of the macro BS 110, and reports the UL monitoring result to the macro BS 110. Herein, the UL monitoring result reported to the macro BS 110 indicates success or failure of the UL monitoring. The femto BS 120 may determine the success or the failure of the UL monitoring based on a reception quality of the UL signal (e.g., Receive Signal Strength Indicator (RSSI) and Carrier to Interference and Noise Ratio (CINR)), reception success or failure of the UL signal, or an attenuation degree of the UL signal.

According to the scanning request of the macro BS 110, the MSs 100-1, 100-2 and 100-3 detect a neighbor femto BS by scanning the femto BS 120 at an effective time. Information of the neighbor femto BS detected may be used for operations such as handover.

Transmission power for the UL signal of the MS is determined through power control with a serving BS. More specifically, for a good link state between the MS and the serving BS, the transmission power of low signal strength is determined. For a poor link state between the MS and the serving BS, the transmission power of high signal strength is determined. In addition, the transmission power of the UL signal is determined based on a modulation and coding scheme of the UL signals and a noise and interference level received at the serving BS.

In the wireless communication system including both the macro BS 110 and the femto BS 120 as illustrated in FIG. 1, the MSs 100-1, 100-2 and 100-3 in the macro cell each transmit the UL signal with different signal strength. Among the MSs 100-1, 100-2 and 100-3 in the macro cell, the MSs 100-2 and 100-3, under the poor link state with the macro BS 110 because of their location in the macro cell boundary, transmit the UL signal with relatively high signal strength. Hence, the UL signal reception quality of the MSs 100-2 and 100-3, which is determined by the femto BS 120, improves.

When the femto BS 120 determines the success or failure of the UL monitoring based on the reception quality of the UL signal or the reception success or failure of the UL signal, it is likely that the femto BS 120 determines the UL monitoring success with respect to the MSs 100-2 and 100-3 which do not enter the femto cell. As a result, the MSs 100-2 and 100-3, which travel outside the femto cell, scan other FA. The scanning of the other FA leads to an unnecessary scanning load to the MSs 100-2 and 100-3.

Accordingly, the determination of the success or failure of the UL monitoring based on the reception quality of the UL signal or the reception success or failure of the UL signal may lower the accuracy of the success or failure determination. In this regard, to raise the accuracy in the success or failure determination of the UL monitoring, an exemplary embodiment of the present invention provides a method for estimating and using signal attenuation (i.e., path loss or propagation loss) between the MSs 100-1, 100-2 and 100-3 and the femto BS 120. Herein, the signal attenuation degree may be easily estimated using the signal strength transmitted from the MSs 100-1, 100-2 and 100-3 and the signal strength received at the femto BS 120. Information relating to the signal strength transmitted from the MSs 100-1, 100-2 and 100-3 may be received from the macro BS 110. More specifically, the femto BS 120 may receive a transmission power value (or suitable information) of the MSs 100-1, 100-2 and 100-3 from the macro BS 110, determine the received signal strength through the UL monitoring on the MSs 100-1, 100-2 and 100-3, determine the UL signal attenuation degree of the corresponding MS 100-1, 100-2 and 100-3 as the difference of the received transmission power value and the received signal strength per MS 100-1, 100-2 and 100-3. The femto BS 120 may thus use the UL signal attenuation degree to determine the success or failure of the UL monitoring.

As such, since the femto BS 120 determines the success or failure of the UL monitoring using the UL signal attenuation degree, the unnecessary scanning load to the MSs 100-2 and 100-3 may be reduced and the accuracy of the UL monitoring determination may be increased. Hereinafter, while the success or failure of the UL monitoring is determined using the reception success or failure of the UL signal and the UL signal attenuation degree, for example, the success or failure of the UL monitoring may be determined using a reception quality of the UL signal, the reception success or failure of the UL signal, and a UL signal attenuation degree alone or in combination including two or more of the determinations.

FIGS. 2 through 5 illustrate a signal diagram of a femto BS detecting method of an MS and operating methods of the MS, a macro BS, and a femto BS according to an exemplary embodiment of the present invention. In more detail, FIGS. 2 through 5 depict methods for detecting the femto BS around the MS in a manner that the macro BS requests the UL monitoring to the femto BS, the femto BS monitors the UL signal of the MS according to the request and reports the UL monitoring result to the macro BS. The macro BS requests the scanning to the MS based on the report and the MS scans at an effective time as requested.

Figure 2:
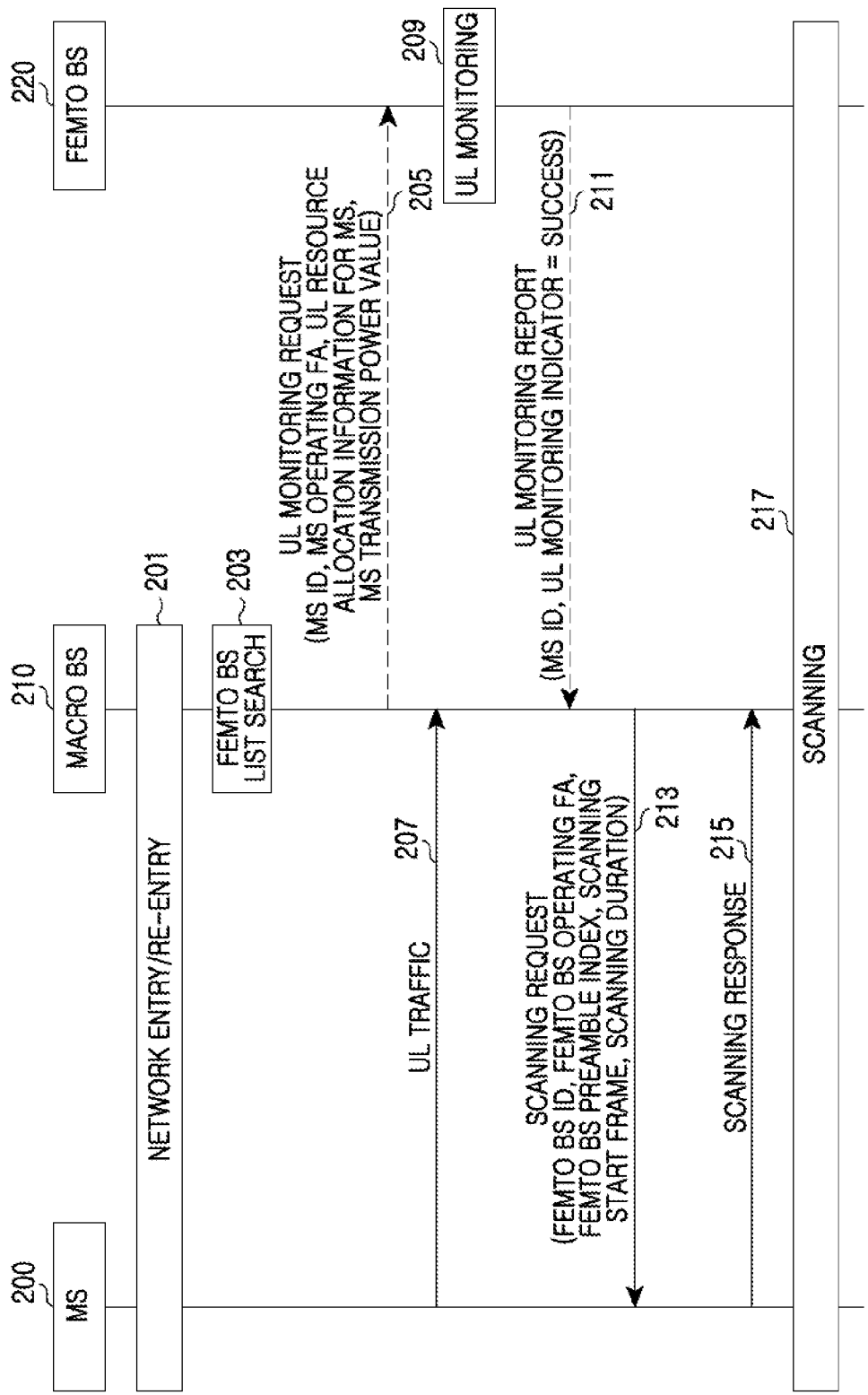
FIG. 2 is a signal diagram of a method for detecting a neighbor femto BS of an MS in the wireless communication system including a macro BS and a femto BS according to an exemplary embodiment of the present invention.

FIG. 2 is a signal diagram of a method for detecting a neighbor femto BS of an MS in a wireless communication system including a macro BS and a femto BS according to an exemplary embodiment of the present invention.

Referring to FIG. 2, when detecting initial access or re-access of the MS 200 in a macro cell, the macro BS 210 performs a network entry or re-entry procedure with the MS 200 in step 201. The network entry procedure may include, for example, ranging, basic capability negotiation, authorization, and registration. The network re-entry procedure may include a portion or all of the network entry procedures. Thus, the MS 200 may communicate with the macro BS 210 through FA1 which is an operating FA of the macro BS 210. At this time, the operating FA of the MS 200 is also the FA1.

In step 203, the macro BS 210 searches a list of femto BSs which permit access to the MS 200 among subordinate femto BSs 220. Herein, the femto BSs 220 belonging to the femto BS list may include an Open Subscriber Group (OSG) femto BS which permits access to every MS, including the MS 200, entering the femto cell, or a Closed Subscriber Group (CSG) femto BS which has the MS 200 as a subscriber MS. The macro BS 210 may search the femto BS list by transmitting and receiving messages to and from a higher entity which manages the femto BS 220. Alternatively, the macro BS 210 may transmit and receive messages to and from the lower femto BS 220.

When a UL resource is allocated to the MS 200 according to scheduling, the macro BS 210 transmits a UL monitoring request message to the femto BSs 220 of the searched femto BS list over a backbone network in step 205. Alternatively, when the UL resource is allocated to the MS 200, the macro BS 210 may transmit the UL monitoring request message by determining a transmission time of the UL monitoring request message according to a separate transmission time determining algorithm. Herein, the UL monitoring request message includes information of the MS 200. For example, the information of the MS 200 may include an MS IDentifier (ID), the operating FA of the MS, UL resource allocation information for the MS, and a transmission power value of the MS. When the UL resource is allocated to the MS 200, the macro BS 210 transmits the UL resource allocation information to the MS 200, which is not illustrated.

According to the UL resource allocation of the macro BS 210 to the MS 200, the MS 200 transmits UL traffic to the macro BS 210 in a corresponding UL traffic transmission interval using the allocated UL resource in step 207.

The femto BS 220 receiving the UL monitoring request message monitors the UL of the MS 200 in the operating FA1 of the MS 200 during the UL traffic transmission interval of the MS 200 in step 209. That is, the femto BS 220 attempts to receive the UL signal of the MS 200. Alternatively, the femto BS 220 receiving the UL monitoring request message may determine whether to monitor the UL according to a separate UL monitoring determination algorithm, and monitor the UL of the MS 200. Herein, when the UL traffic transmission interval of the MS 200 ends, the femto BS 220 may perform a normal operation in its operating FA2.

In step 211, the femto BS 220 determines the success or failure of the UL monitoring and transmits a UL monitoring report including the UL monitoring result as determined to the macro BS 210 over the backbone network. Alternatively, when determining the failure of the UL monitoring, the femto BS 220 may not transmit any message. The success or failure of the UL monitoring may be determined using the UL signal reception quality, the reception success or failure of the UL signal, and the UL signal attenuation degree alone or in combination of two or more of the determinations. Herein, the femto BS 220 may determine the received signal strength by monitoring the UL of the MS 200 and determine the difference of the determined received signal strength and the transmission power value of the MS 200 received from the macro BS 210 as the UL signal attenuation degree. The UL monitoring report message may include the MS ID, a UL monitoring indicator, and the like. The UL monitoring indicator indicates the UL monitoring success or failure of the MS UL signal of the femto BS 220.

Next, the macro BS 210 receiving the UL monitoring report message examines the UL monitoring indicator in the UL monitoring report message. When the UL monitoring indicator indicates the success of the UL monitoring, the macro BS 210 transmits a Mobile Scanning Request (MOB-_SCN-REQ) message requesting to scan the femto BS 220, to the MS 200 through the operating FA1 in step 213. When the UL monitoring indicator indicates the failure of the UL monitoring, the macro BS 210 repeats the operations from the transmitting of the UL monitoring request message to the receiving of the UL monitoring report message. Herein, the MOB_SCN-REQ message includes scanning related information of the MS 200 and information of the femto BS 220 which reports of the UL monitoring success. The scanning related information of the MS 200 may include a scanning start frame, a scanning duration, and the like. The information of the femto BS 220 may include a femto BS ID, the operating FA of the femto BS, and a preamble index of the femto BS.

The MS 200 receiving the MOB_SCN-REQ message transmits a Mobile Scanning Response (MOB_SCN-RSP) message to the macro BS 210 in step 215. The scanning is conducted on the preamble of the femto BS 220 in an operating FA2 of the femto BS 220 at an effective time according to the scanning related information in step 217. Herein, the effective time according to the scanning related information indicates the scanning duration from the scanning start frame. Thus, the MS 200 may detect the neighbor femto BS and use the information of the neighbor femto BS acquired through the detection in a series of operations such as handover. When the MS 200 does not receive the MOB_SCN-REQ message, the MS 200 repeats the normal data transmission and reception with the macro BS 210.

Figure 3:
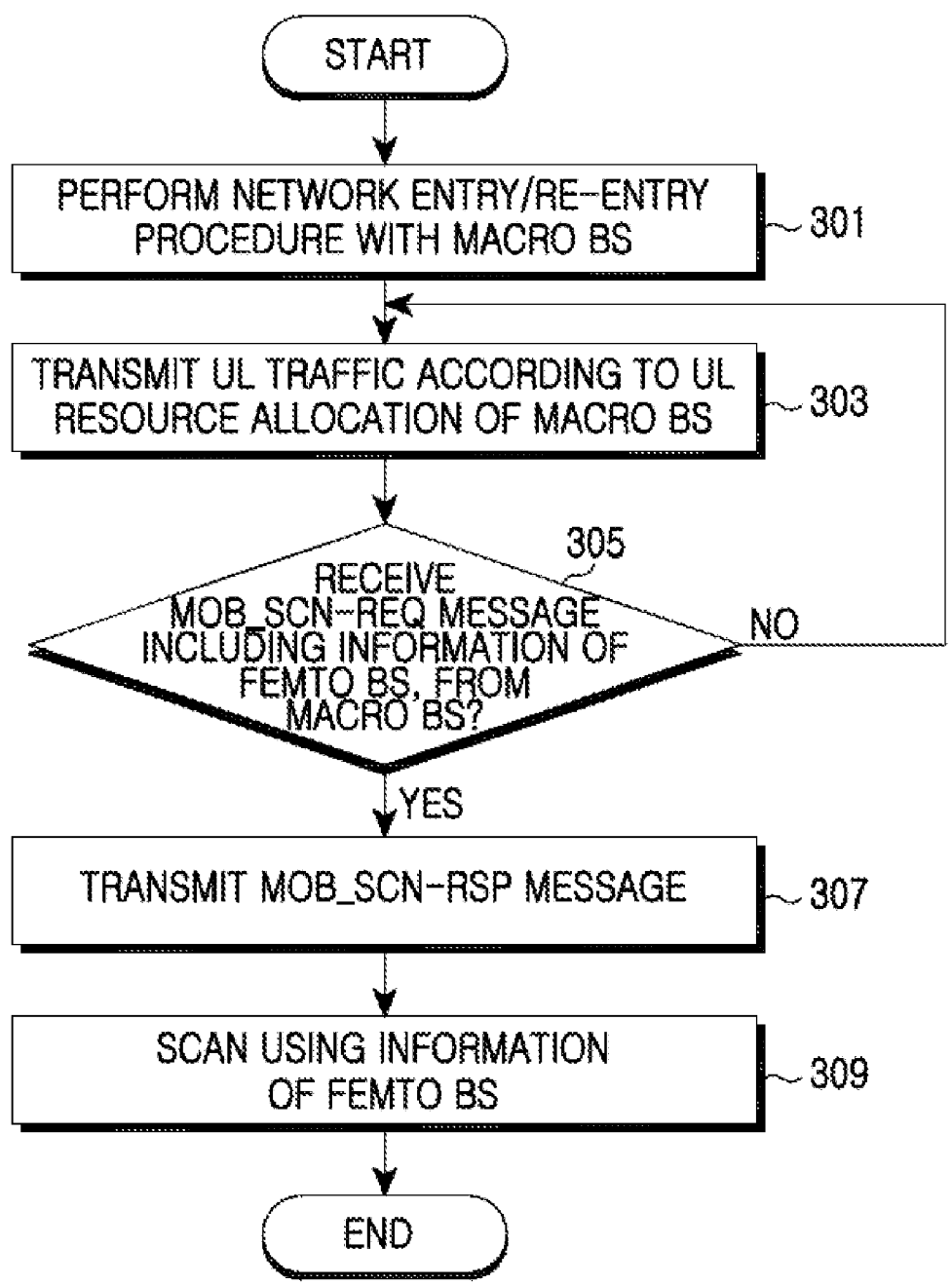
FIG. 3 is a flowchart of an operating method of an MS for detecting a neighbor femto BS in a wireless communication system including a macro BS and a femto BS according to an exemplary embodiment of the present invention.

FIG. 3 is a flowchart of an operating method of an MS for detecting a neighbor femto BS in a wireless communication system including a macro BS and a femto BS according to an exemplary embodiment of the present invention.

Referring to FIG. 3, in step 301, the MS performs a network entry procedure or a network re-entry procedure with the macro BS. When detecting on power, the MS searches a BS to access. Upon searching the macro BS, the MS may conduct the network entry procedure or the network re-entry procedure with the searched macro BS. The network entry procedure may include, for example, ranging, basic capability negotiation, authorization, and registration. The network re-entry procedure may include a portion or all of the network entry procedures. Thus, the MS may communicate with the macro BS through FA1 which is an operating FA of the macro BS. Accordingly, the operating FA of the MS is also the FA1.

In step 303, the MS transmits UL traffic to the macro BS in a corresponding UL traffic transmission interval over an allocated UL resource according to its UL resource allocation of the macro BS in step 303.

In step 305, the MS determines whether a MOB_SCN-REQ message requesting to scan the femto BS is received from the macro BS through an operating FA1. Herein, the MOB_SCN-REQ message includes scanning related information of the MS and information of the femto BS. The scanning related information of the MS may include a scanning start frame, a scanning duration, and the like. The information of the femto BS, which relates to the femto BS reporting of the UL monitoring success of an MS UL signal to the macro BS, may include the femto BS ID, the operating FA of the femto BS, and a preamble index of the femto BS.

When the MS does not receive the MOB_SCN-REQ message in step 305, the MS returns to step 303.

In contrast, when the MS receives the MOB_SCN-REQ message in step 305, the MS transmits a MOB_SCN-RSP message to the macro BS in step 307 and scans the femto BS using the scanning related information of the MS and the information of the femto BS in step 309. That is, the MS scans a preamble of the femto BS in an operating FA2 of the femto BS during the scanning duration from the scanning start frame. Hence, the MS may detect the neighbor femto BS.

Thereafter, the MS ends the process.

Figure 4:
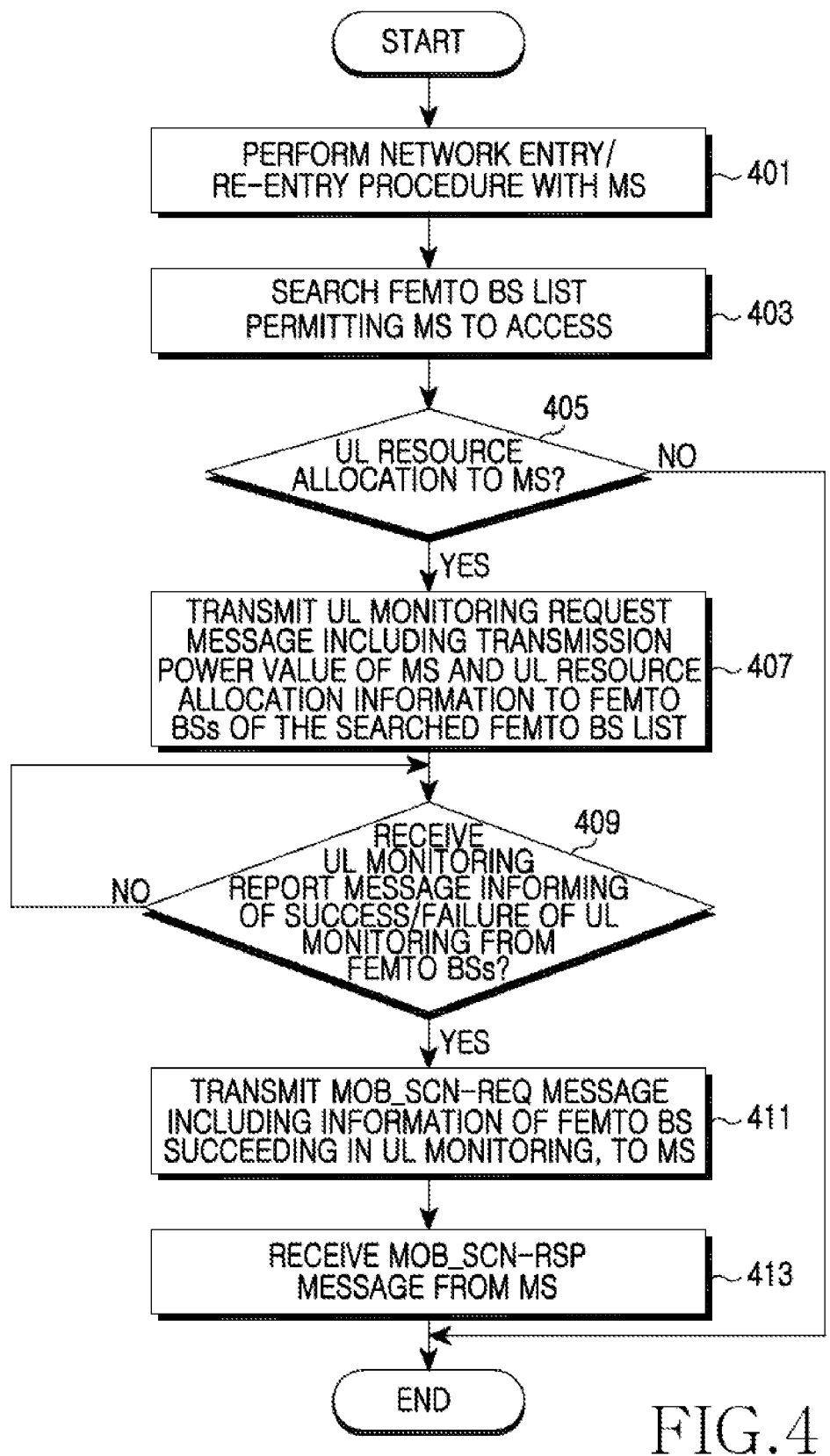
FIG. 4 is a flowchart of an operating method of a macro BS for detecting a neighbor femto BS of an MS in the wireless communication system including a macro BS and a femto BS according to an exemplary embodiment of the present invention.

FIG. 4 is a flowchart of an operating method of a macro BS for detecting a neighbor femto BS of an MS in a wireless communication system including a macro BS and a femto BS according to an exemplary embodiment of the present invention.

Referring to FIG. 4, upon detecting an initial access or a re-access of the MS within a macro cell, the macro BS performs a network entry procedure or a network re-entry procedure with the MS in step 401. The network entry procedure may include, for example, ranging, basic capability negotiation, authorization, and registration. The network re-entry procedure may include a portion or all of the network entry procedures. Thus, the MS may communicate with the macro BS through FA1 which is an operating FA of the macro BS. At this time, the operating FA of the MS is also the FA1.

In step 403, the macro BS searches a list of the femto BSs which permit access to the MS among its lower femto BSs. The femto BSs belonging to the femto BS list may include an OSG femto BS which permits access to every MS entering the femto cell, including the MS, or a CSG femto BS which includes the MS as a subscriber MS. The macro BS may search the femto BS list by transmitting and receiving messages with a higher entity which manages the femto BS. Alternatively, the macro BS may transmit and receive messages with a lower femto BS.

In step 405, the macro BS determines whether the UL resource is allocated to the MS according to the scheduling.

When the UL resource is not allocated to the MS in step 405, the macro BS ends the process.

In contrast, when the UL resource is allocated to the MS in step 405, the macro BS transmits the UL monitoring request message to the femto BSs of the searched femto BS list over a backbone network in step 407. Herein, the UL monitoring request message includes information of the MS. For example, the MS information may include an MS ID, the operating FA of the MS, UL resource allocation information for the MS, and a transmission power value of the MS.

In step 409, the macro BS determines whether the UL monitoring report message informing of the UL monitoring success or failure for the MS is received from the femto BSs over the backbone network. The UL monitoring report message may include the MS ID and the UL monitoring indicator. The UL monitoring indicator indicates the UL monitoring success or failure with respect to an MS UL signal of a corresponding femto BS.

When receiving the UL monitoring report message in step 409, the macro BS examines the UL monitoring indicator in the UL monitoring report message, searches the femto BSs which succeed in the UL monitoring of the MS UL signal, and transmits a MOB_SCN-REQ message requesting to scan the searched femto BSs to the MS through the operating FA1 in step 411. Herein, the MOB_SCN-REQ message includes the scanning related information of the MS and the information of the femto BSs reporting of the UL monitoring success. The scanning related information of the MS may include a scanning start frame and a scanning duration. The information of the femto BS may include the femto BS ID, the operating FA of the femto BS, and a preamble index of the femto BS.

In step 413, the macro BS receives the MOB_SCN-RSP message from the MS.

Thereafter, the macro BS ends the process.

Figure 5:
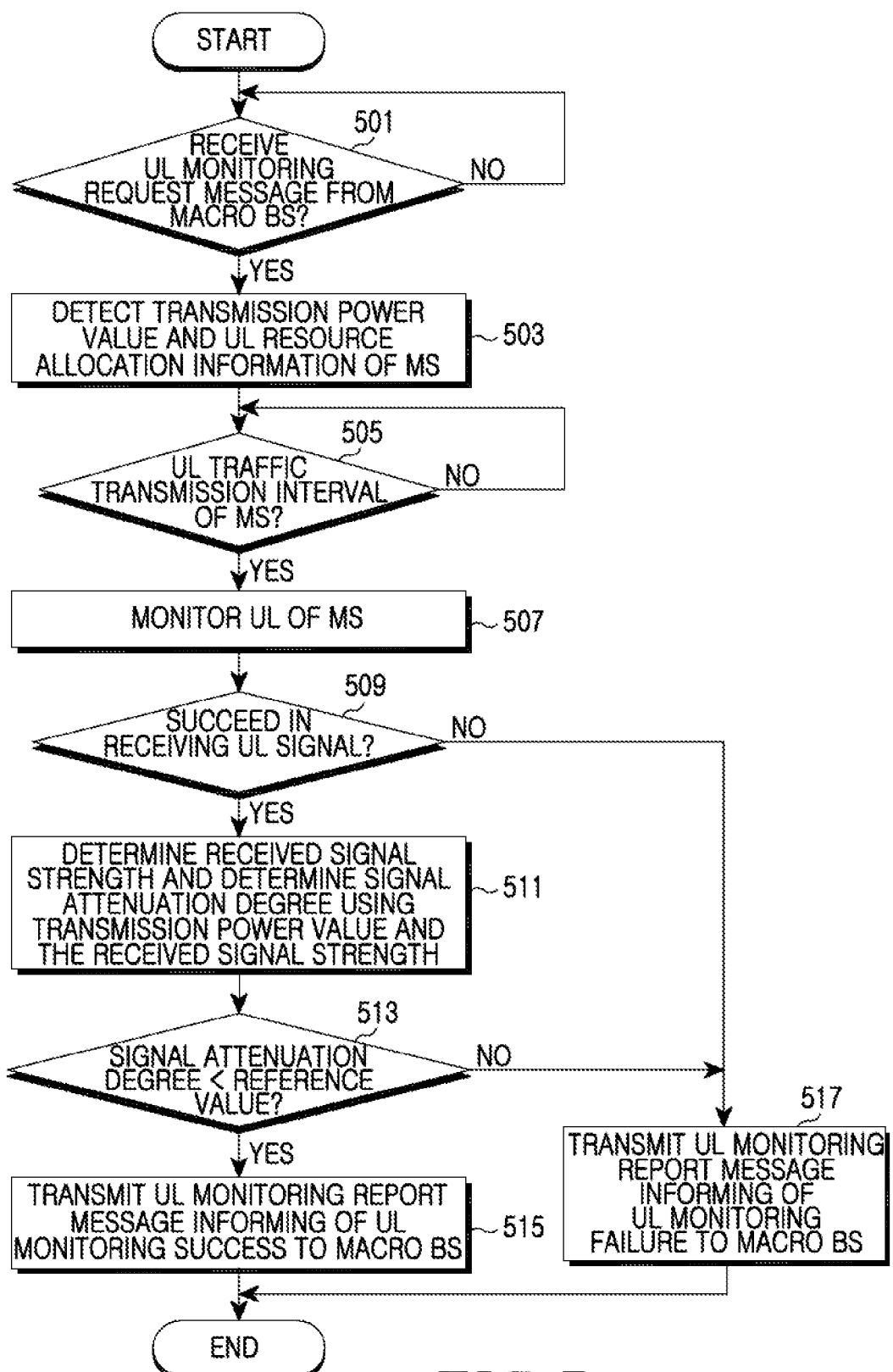
FIG. 5 is a flowchart of an operating method of a femto BS for detecting a neighbor femto BS of an MS in the wireless communication system including a macro BS and a femto BS according to an exemplary embodiment of the present invention.

FIG. 5 is a flowchart of an operating method of a femto BS for detecting a neighbor femto BS of an MS in a wireless communication system including a macro BS and a femto BS according to an exemplary embodiment of the present invention.

Referring to FIG. 5, in step 501, the femto BS determines whether a UL monitoring request message is received from the macro BS over a backbone network. Herein, the UL monitoring request message includes information of the MS which is a target of UL monitoring. For example, the information of the MS may include an MS ID, an operating FA of the MS, UL resource allocation information for the MS, and a transmission power value of the MS.

Upon receiving the UL monitoring request message in step 501, the femto BS detects the MS information, that is, the MS ID, the operating FA of the MS, the UL resource allocation information for the MS, and the transmission power value of the MS from the received UL monitoring request message in step 503.

In step 505, the femto BS determines a UL traffic transmission interval of the MS using the UL resource allocation information. That is, the femto BS determines whether a current time is a start of the UL traffic transmission interval which carries UL traffic from the MS to the macro BS over an allocated UL resource, based on the UL resource allocation of the macro BS.

In the UL traffic transmission interval of the MS in step 505, the femto BS monitors the UL of the MS in an operating FA1 of the MS during the UL traffic transmission interval of the MS in step 507. More specifically, the femto BS attempts to receive the UL signal for the MS.

In step 509, the femto BS determines whether it successfully receives the UL signal for the MS. For example, success or failure of the UL signal reception may be determined by determining whether the UL signal quality (e.g., RSSI and CINR) is greater than a reference value.

When successfully receiving the UL signal of the MS in step 509, the femto BS determines the received signal strength of the UL signal of the MS and determines an attenuation degree of the UL signal using the determined received signal strength and the transmission power value of the MS received via the UL monitoring request message from the macro BS in step 511. Herein, the attenuation degree of the UL signal may be determined as the difference between the transmission power value of the MS and the received signal strength.

In step 513, the femto BS determines whether the determined attenuation degree of the UL signal is less than the reference value.

When the determined attenuation of the UL signal is less than the reference value in step 513, the femto BS determines the success of the UL monitoring and transmits the UL monitoring report message informing of the UL monitoring success to the macro BS over a backbone network in step 515. The UL monitoring report message may include an MS ID and a UL monitoring indicator. The UL monitoring indicator indicates the success or the failure of the UL monitoring with respect to an MS UL signal of the femto BS.

In contrast, when the UL signal of the MS is not successfully received in step 509 or when the determined attenuation of the UL signal is not less than the reference value in step 513, the femto BS determines the failure of the UL monitoring and transmits the UL monitoring report message informing of the UL monitoring failure to the macro BS over the backbone network in step 517.

Thereafter, the femto BS ends the process.

As such, according to an exemplary embodiment of the present invention, the femto BS monitors the UL every time the UL resource is allocated to a corresponding MS, with respect to the MS of which access is permissible, and supports the MS to detect the neighbor femto BS.

Since the UL monitoring function of the femto BS is carried out in a UL interval, it is necessary to temporarily stop UL data transmission of the MS serviced by the femto BS during the UL monitoring. A CSG femto BS which permits access of only a few subscriber terminals has a relatively low UL monitoring request occurrence. However, the CSG femto BS allowing a plurality of subscriber terminals to access or an OSG femto BS allowing every MS entering the femto cell to access may encounter the frequent UL monitoring requests, which may impose an excessive constraint on the UL data transmission of the MS serviced by the femto BS.

According to an exemplary embodiment of the present invention, a method for detecting the neighbor femto BS of the MS such that every lower femto BS of the macro BS simultaneously execute a UL monitoring function in the UL monitoring interval with respect to every MS permissible to access is provided.

FIGS. 6 through 10 illustrate a structure of a UL monitoring frame, a signal diagram, operating methods of the MS, a macro BS, and a femto BS in relation to the femto BS detecting method of the MS according to an exemplary embodiment of the present invention. More specifically, the macro BS transmits the UL monitoring configuration information to all lower femto BSs. The femto BS monitors the UL monitoring header of every MS permissible to access in a UL monitoring interval using the UL monitoring configuration information and reports the UL monitoring result to the macro BS. The macro BS requests the scanning to the MSs in the macro cell according to the report, and the MSs scan at an effective time as requested. Thus, the MSs in the macro cell may detect their neighbor femto BS.

Figure 6:
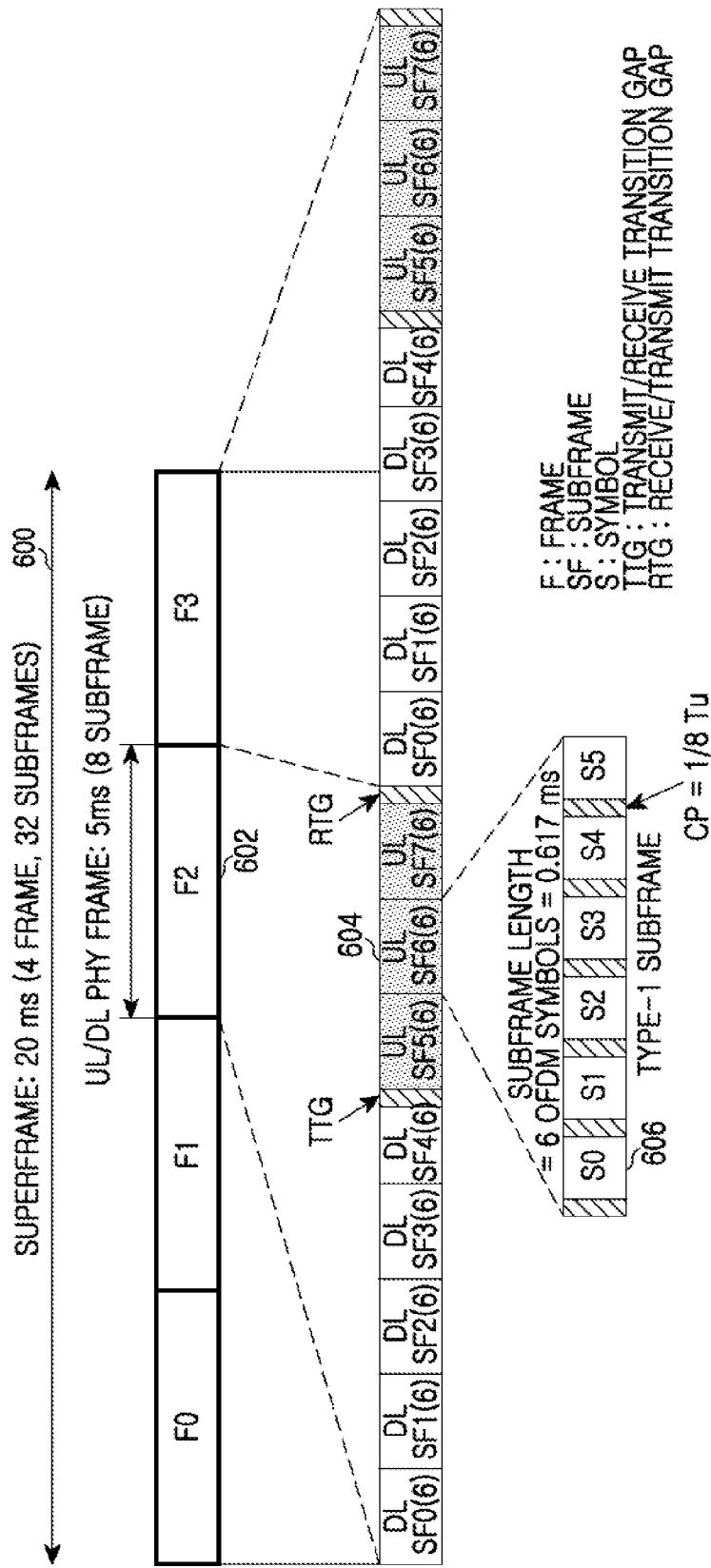
FIG. 6 is a diagram of a UL monitoring frame structure in a wireless communication system including a macro BS and a femto BS according to an exemplary embodiment of the present invention.

FIG. 6 is a diagram of a UL monitoring frame structure in a wireless communication system including a macro BS and a femto BS according to an exemplary embodiment of the present invention. While a frame structure of the IEEE standard 802.16m system is described below, other systems according to an exemplary embodiment the present invention may be applicable.

Referring to FIG. 6, a superframe 600 in the IEEE standard 802.16m frame structure includes four frames 602. One frame 602 includes eight subframes 604, a Transmit/receive Transition Gap (TTG), and a Receive/transmit Transition Gap (RTG). One subframe 604 includes six OFDM symbols 606 and six Cyclic Prefixes (CPs).

The UL monitoring frame, which includes a UL monitoring subframe, may be transmitted periodically. For example, among four frames 602 in the superframe including the UL monitoring frame, a second frame and a third frame may be used as the UL monitoring frame. The UL monitoring subframe is a UL subframe interval where the femto BS monitors the UL of the MS. A single or a plurality of the UL subframes may be connected in succession and used as the UL monitoring subframe.

Figure 7:
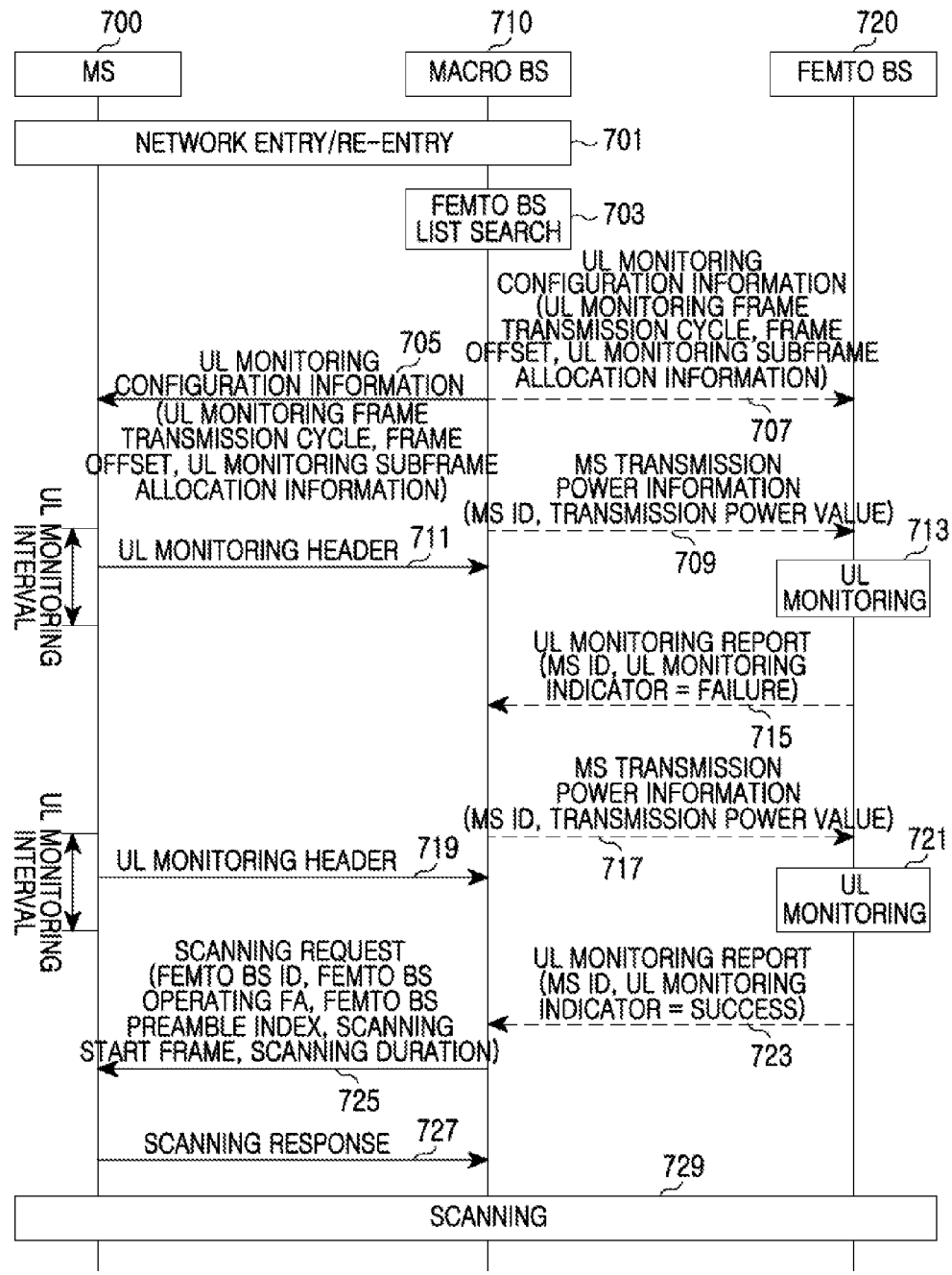
FIG. 7 is a signal diagram of a method for detecting a neighbor femto BS of an MS in a wireless communication system including a macro BS and a femto BS according to an exemplary embodiment of the present invention.

FIG. 7 is a signal diagram of a method for detecting a neighbor femto BS of an MS in a wireless communication system including a macro BS and a femto BS according to an exemplary embodiment of the present invention.

Referring to FIG. 7, when detecting an initial access or a re-access of the MS 700 in a macro cell, the macro BS 710 performs a network entry or re-entry procedure with the MS 700 in step 701. The network entry procedure may include, for example, ranging, basic capability negotiation, authorization, and registration. The network re-entry procedure may include a portion or all of the network entry procedures. Thus, the MS 700 may communicate with the macro BS 710 through FA1 which is an operating FA of the macro BS 710. Accordingly, the operating FA of the MS 700 is also the FA1.

In step 703, the macro BS 710 searches a list of all of its lower femto BSs. Herein, the femto BSs 720 belonging to the femto BS list may include an OSG femto BS which permits access to every MS entering the femto cell, or a CSG femto BS which permits access to a subscriber MS. Herein, it is assumed that the femto BS 720 permits the MS 700 to access. The macro BS 710 may search the femto BS list by transmitting and receiving messages to and from a higher entity which manages the femto BS 720. Alternatively, the macro BS 710 may transmit and receive messages to and from its lower femto BS 720.

In step 705, the macro BS 710 transmits a UL monitoring configuration information message to the MS 700. Herein, the macro BS 710 may generate and transmit the UL monitoring configuration information message, as a broadcast message, to the MS 700. Alternatively, the macro BS 710 may transmit the UL monitoring configuration information message to the MS 700 using a message transmitted in the network entry or re-entry procedure with the MS 700. The UL monitoring configuration information message may include UL monitoring interval information and Logical Resource Unit (LRU) mapping information for each MS. The UL monitoring interval information may include a UL monitoring frame transmission cycle indicating a number of frames allocated as the UL monitoring frame, a frame offset indicating a start of the UL monitoring frame in the superframe, and UL monitoring subframe allocation information. Each MS may be assigned one LRU for carrying a UL monitoring header. The UL monitoring configuration information message may include the LRU mapping information for each MS according to the allocation. Herein, the mapping relation of the UL monitoring header and the LRU of the MS may be defined separately.

In step 707, the macro BS 710 also transmits the UL monitoring configuration information message to the femto BSs 720 of the searched femto BS list over a backbone network. Alternatively, the macro BS 710 may transmit resource allocation information relating to the resource through which an active-mode MS is to transmit the UL monitoring header in the UL monitoring subframe for each UL monitoring interval, to the femto BSs 720 of the searched femto BS list using mapping information.

Before the UL monitoring interval, the macro BS 710 transmits an MS transmission power information message to the femto BSs 720 of the femto BS list over the backbone network in step 709. The MS transmission power information message may include an MS ID and a transmission power value.

In step 711, the MS 700 confirms it allocated LRU using the LRU mapping information per MS, confirms the UL monitoring interval and the UL monitoring subframe using the UL monitoring interval information, generates and transmits the UL monitoring header to the macro BS 710 through its allocated LRU in the UL monitoring subframe during the UL monitoring interval. Herein, the MS 700 may generate the UL monitoring header by including a portion or all of the MS ID and a Cyclic Redundancy Code (CRC). The MS 700 transmitting the UL monitoring header is the active-mode MS in the UL monitoring subframe.

In step 713, the femto BSs 720 of the femto BS list confirm the LRU allocated to each MS 700 using the LRU mapping information of each MS with respect to every MS allowable to access, confirm the UL monitoring interval and the UL monitoring subframe using the UL monitoring interval information, and then monitors the UL of the corresponding MS 700 in the UL monitoring interval. That is, the femto BSs 720 attempt to receive the UL monitoring header from the MS 700 in an operating FA1 of the MS 700. Herein, when the UL monitoring interval of the MS 700 ends, the femto BSs 720 of the femto BS list normally operate in their operating FA2.

In step 715, the femto BSs 720 of the femto BS list determine success or the failure of the UL monitoring and transmit a UL monitoring report message including the UL monitoring result determined to the macro BS 710 over the backbone network. Alternatively, when determining the failure of the UL monitoring, the femto BSs 720 of the femto BS list may not transmit any message. The success or failure of the UL monitoring may be determined using the reception quality of the UL signal (i.e., the UL monitoring header), the reception success or failure of the UL signal, and a UL signal attenuation degree alone or in combination including two or more of the determinations. Herein, to acquire the UL signal attenuation degree, the femto BSs 720 of the femto BS list may determine received signal strength through the UL monitoring on the MS 700 and determine a difference of the determined received signal strength and the transmission power value of the MS 700 received from the macro BS 710 as the UL signal attenuation degree. The UL monitoring report message may include the MS ID and the UL monitoring indicator. The UL monitoring indicator indicates the success or the failure of the UL monitoring with respect to the MS UL monitoring header of the corresponding femto BS 720.

Meanwhile, when the UL monitoring frame is two frames in the superframe according to the frame structure of FIG. 6, there may be two UL monitoring intervals as illustrated in FIG. 7. After step 715, the MS 700, the macro BS 710, and the femto BS 720 may repeat steps 709 through 715, that is, proceed to steps 717 through 723.

In step 725, the macro BS 710 receiving the UL monitoring report message examines the UL monitoring indicator in the UL monitoring report message per femto BS 720, searches the femto BSs 720 reporting of the success of the UL monitoring, and transmits a MOB_SCN-REQ message requesting to scan the searched femto BSs 720 to the MS 700 through the operating FA1. Herein, the MOB_SCN-REQ message includes the scanning related information of the MS 700 and the information of the femto BS 720 reporting of the UL monitoring success. The scanning related information of the MS 700 may include a scanning start frame and a scanning duration. The information of the femto BS 720 may include the femto BS ID, an operating FA of the femto BS, and a preamble index of the femto BS.

The MS 700 receiving the MOB_SCN-REQ message transmits a MOB_SCN-RSP message to the macro BS 710 in step 727, and scans a preamble of the femto BSs 720 at an effective time according to the scanning related information in the operating FA2 of the femto BSs 720 reporting of its UL monitoring success in step 729. Herein, the effective time according to the scanning related information indicates the scanning duration from the scanning start frame. Thus, the MS 700 may detect its neighbor femto BS and utilize the information of the neighbor femto BS detected for a series of operations such as handover. If the MS 700 does not receive the MOB_SCN-REQ message, the MS 700 repeat normal data transmission and reception with the macro BS 710.

Figure 8:
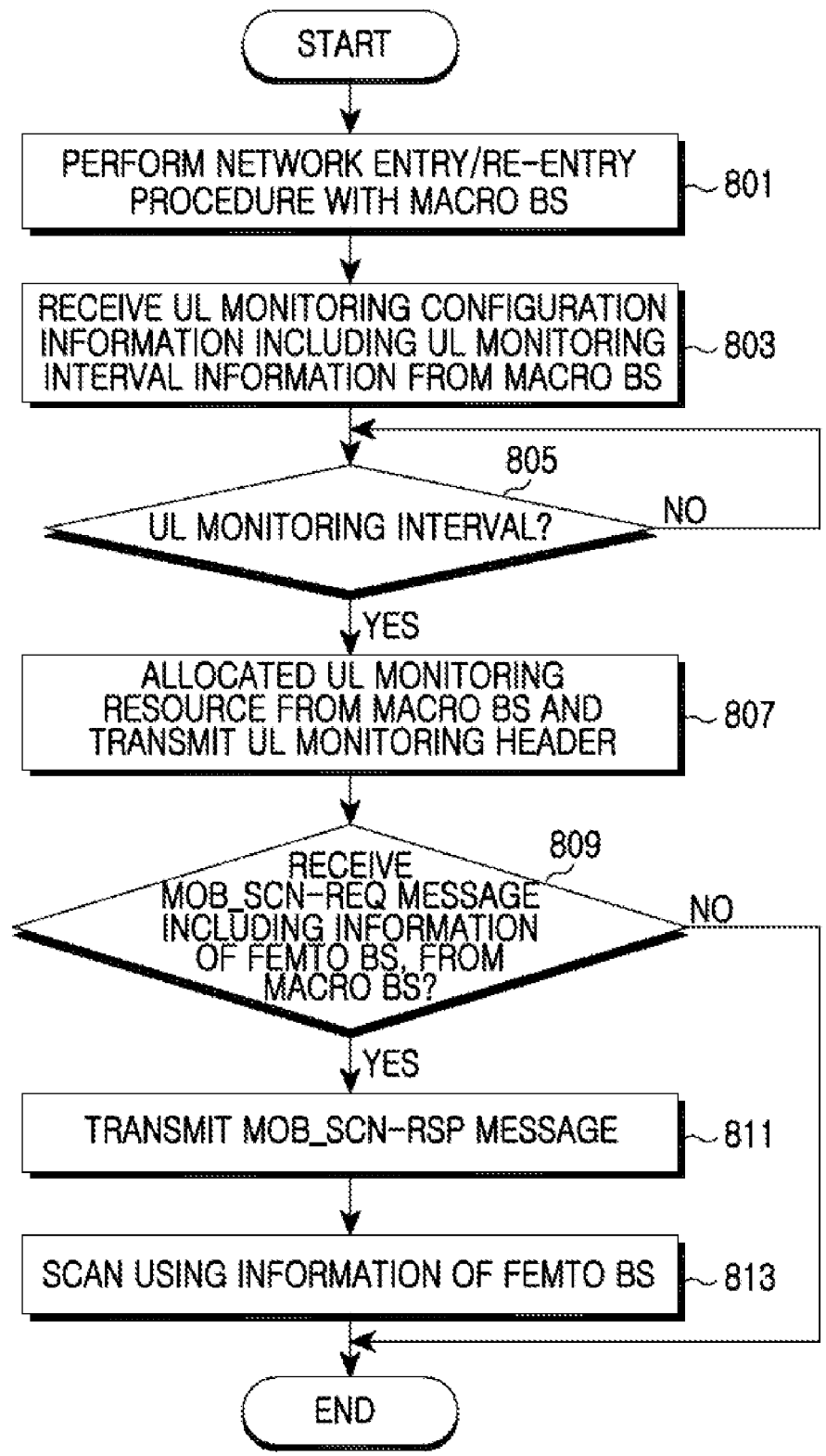
FIG. 8 is a flowchart of an operating method of an MS for detecting a neighbor femto BS in a wireless communication system including a macro BS and a femto BS according to an exemplary embodiment of the present invention.

FIG. 8 is a flowchart of an operating method of an MS for detecting a neighbor femto BS in a wireless communication system including a macro BS and a femto BS according to an exemplary embodiment of the present invention.

Referring to FIG. 8, in step 801, the MS performs a network entry procedure or a network re-entry procedure with the macro BS. When detecting on power, the MS searches a BS to connect. Upon searching the macro BS, the MS may conduct the network entry procedure or the network re-entry procedure with the searched macro BS. The network entry procedure may include, for example, ranging, basic capability negotiation, authorization, and registration. The network re-entry procedure may include a portion or all of the network entry procedures. Thus, the MS may communicate with the macro BS through FA1 which is an operating FA of the macro BS. Accordingly, the operating FA of the MS is also the FA1.

In step 803, the MS receives a UL monitoring configuration information message from the macro BS. Herein, the UL monitoring configuration information message may include UL monitoring interval information and each MS LRU mapping information. The UL monitoring interval information may include a UL monitoring frame transmission cycle, a frame offset, and a UL monitoring subframe allocation information. The MS may confirm its allocated LRU using each MS LRU mapping information, and confirm a UL monitoring interval and a UL monitoring subframe using the UL monitoring interval information.

In step 805, the MS determines whether it is the UL monitoring interval using the UL monitoring interval information. That is, the MS determines whether a current time is a start of the UL monitoring interval for carrying a UL monitoring header to the macro BS through its allocated LRU in the UL monitoring subframe.

In the UL monitoring interval in step 805, the MS is allocated a UL monitoring resource (i.e., the UL monitoring subframe) according to the UL monitoring subframe allocation information from the macro BS, generates and transmits the UL monitoring header to the macro BS through its allocated LRU in the UL monitoring subframe during the UL monitoring interval in step 807. Herein, the MS may generate the UL monitoring header including a portion or all of an MS ID and a CRC.

In step 809, the MS determines whether a MOB_SCN-REQ message requesting to scan the femto BS is received from the macro BS through the operating FA1. Herein, the MOB_SCN-REQ message requests to scan the femto BS which reports of UL monitoring success of the UL monitoring header pre-transmitted by the MS. The MOB_SCN-REQ message includes scanning related information of the MS and information of the femto BS. The scanning related information of the MS may include a scanning start frame and a scanning duration. The information of the femto BS, which relates to the femto BS reporting of the UL monitoring success of the UL monitoring header transmitted from the MS, may include a femto BS ID, an operating FA of the femto BS, and a preamble index of the femto BS.

When the MS does not receive the MOB_SCN-REQ message in step 809, the MS ends the process.

In contrast, when the MS receives the MOB_SCN-REQ message in step 809, the MS transmits a MOB_SCN-RSP message to the macro BS in step 811 and scans the femto BS using the scanning related information of the MS and the information of the femto BS in step 813. That is, the MS scans a preamble of the femto BS in an operating FA2 of the femto BS during the scanning duration from the scanning start frame. Hence, the MS may detect the neighbor femto BS.

Thereafter, the MS ends the process.

Figure 9:
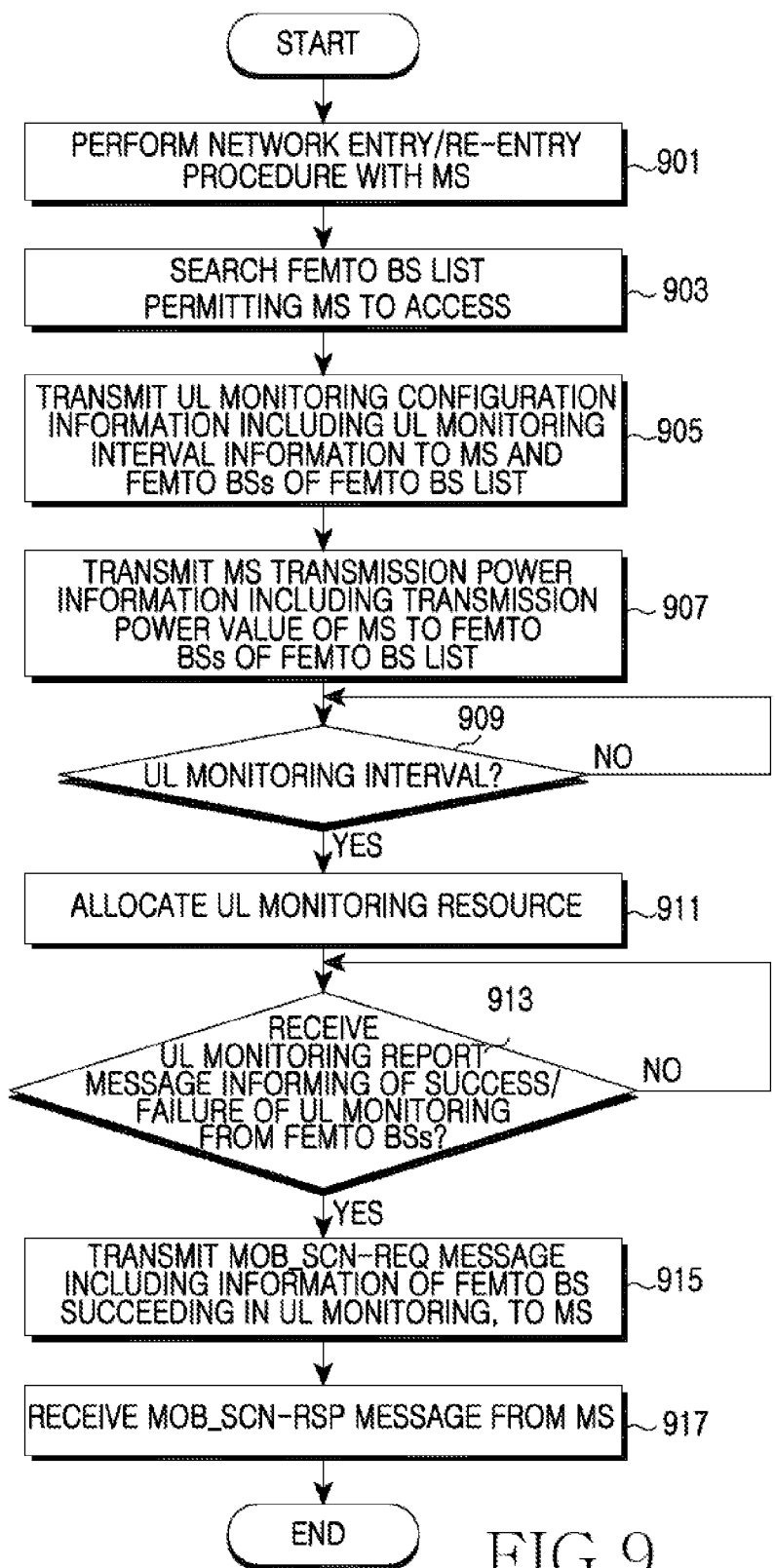
FIG. 9 is a flowchart of an operating method of a macro BS for detecting a neighbor femto BS of an MS in a wireless communication system including a macro BS and a femto BS according to an exemplary embodiment of the present invention.

FIG. 9 is a flowchart of an operating method of a macro BS for detecting a neighbor femto BS of an MS in a wireless communication system including a macro BS and a femto BS according to an exemplary embodiment of the present invention.

Referring to FIG. 9, upon detecting an initial access or a re-access of the MS within the macro cell, the macro BS performs a network entry procedure or the network re-entry procedure with the MS in step 901. The network entry procedure may include, for example, ranging, basic capability negotiation, authorization, and registration. The network re-entry procedure may include a portion or all of the network entry procedures. Thus, the MS may communicate with the macro BS through FA1 which is an operating FA of the macro BS. At this time, the operating FA of the MS is also the FA1.

In step 903, the macro BS searches a list of its lower femto BSs. Herein, the femto BSs belonging to the femto BS list may include an OSG femto BS which permits access to every MS entering the femto cell, or a CSG femto BS which permits access to a subscriber MS. The macro BS may search the femto BS list by transmitting and receiving messages with a higher entity which manages the femto BS. Alternatively, the macro BS may transmit and receive messages with a lower femto BS.

In step 905, the macro BS transmits the UL monitoring configuration information message to the MS and transmits the UL monitoring configuration information message to the femto BSs of the searched femto BS list over a backbone network. The UL monitoring configuration information message may include UL monitoring interval information and each MS LRU mapping information. The UL monitoring interval information may include a UL monitoring frame transmission cycle, a frame offset, and UL monitoring subframe allocation information.

Before the UL monitoring interval, the macro BS transmits the MS transmission power information message to the femto BSs of the femto BS list over the backbone network in step 907. The MS transmission power information message may include an MS ID and a transmission power value.

In step 909, the macro BS determines the UL monitoring interval. In the UL monitoring interval, the macro BS allocates the MS the UL monitoring resource (i.e., the UL monitoring subframe) according to the UL monitoring subframe allocation information in step 911.

In step 913, the macro BS determines whether the UL monitoring report message informing of the UL monitoring success or failure for the MS is received from the femto BSs of the femto BS list over the backbone network. The UL monitoring report message may include the MS ID and a UL monitoring indicator. The UL monitoring indicator indicates the UL monitoring success or failure with respect to the MS UL monitoring header of the corresponding femto BS.

When receiving the UL monitoring report message in step 913, the macro BS examines the UL monitoring indicator in the UL monitoring report message for each femto BS, searches the femto BSs which succeed in the UL monitoring on the MS UL monitoring header, and transmits a MOB_SCN-REQ message requesting to scan the searched femto BSs to the MS through the operating FA1 in step 915. Herein, the MOB_SCN-REQ message includes the scanning related information of the MS and the information of the femto BSs reporting of the UL monitoring success. The scanning related information of the MS may include a scanning start frame and a scanning duration. The information of the femto BS may include a femto BS ID, an operating FA of the femto BS, and a preamble index of the femto BS.

In step 917, the macro BS receives a MOB_SCN-RSP message from the MS.

Thereafter, the macro BS ends the process.

Figure 10:
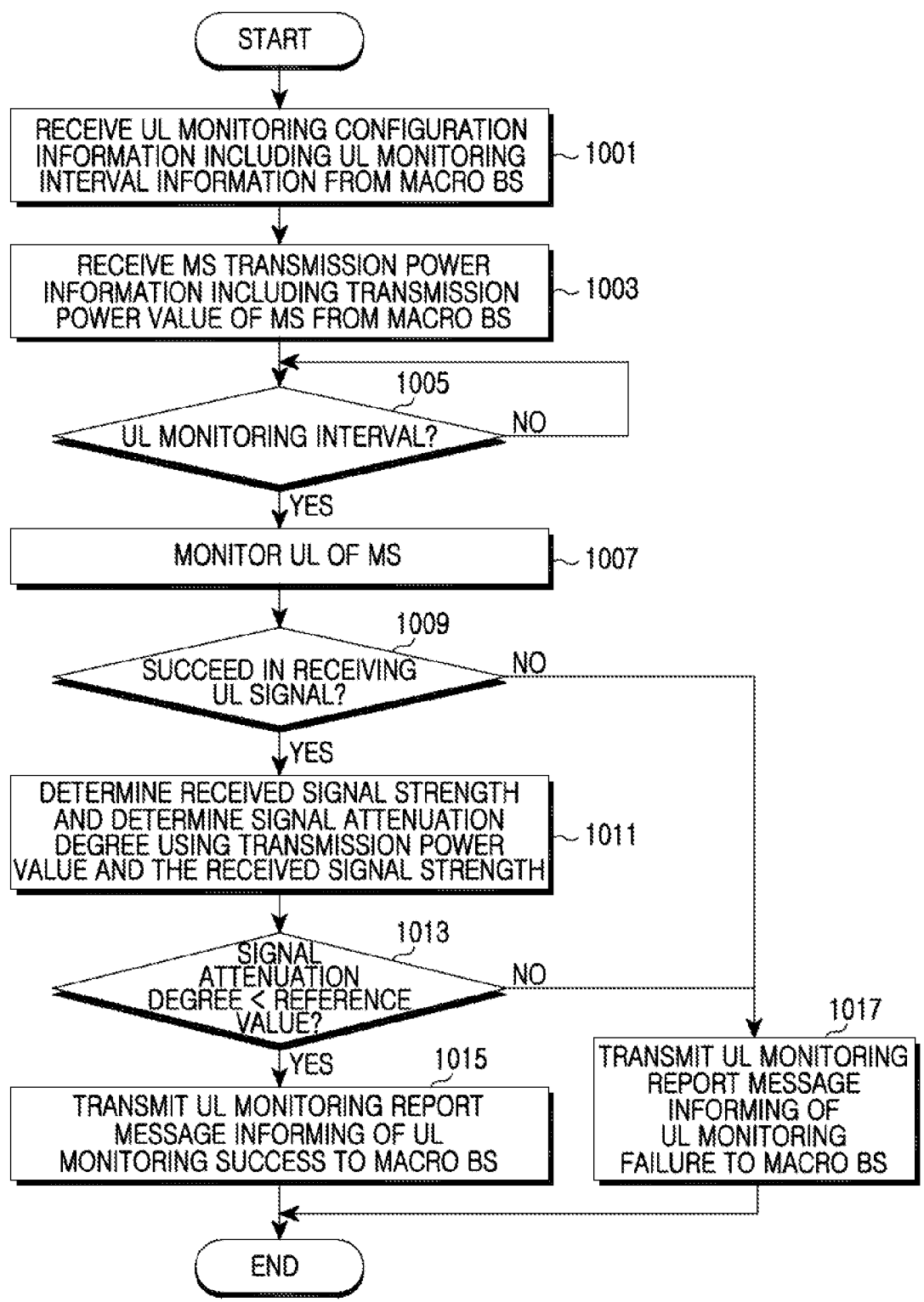
FIG. 10 is a flowchart of an operating method of a femto BS for detecting a neighbor femto BS of an MS in a wireless communication system including a macro BS and a femto BS according to an exemplary embodiment of the present invention.

FIG. 10 is a flowchart of an operating method of a femto BS for detecting a neighbor femto BS of an MS in a wireless communication system including a macro BS and a femto BS according to an exemplary embodiment of the present invention.

Referring to FIG. 10, the femto BS receives a UL monitoring configuration information message from the macro BS over a backbone network in step 1001. The UL monitoring configuration information message may include UL monitoring interval information and each MS LRU mapping information. The UL monitoring interval information may include a UL monitoring frame transmission cycle, a frame offset, and UL monitoring subframe allocation information.

In step 1003, the femto BS receives the MS transmission power information message from the macro BS over a backbone network. The MS transmission power information message may include an MS ID and a transmission power value.

In step 1005, the femto BS determines whether it is a UL monitoring interval using the UL monitoring interval information. That is, the femto BS determines whether a current time is a start of the UL monitoring interval which carries a UL monitoring header from the MS in a UL monitoring subframe.

In the UL monitoring interval in step 1005, with respect to every MS permissible to access, the femto BS confirms the LRU allocated to each MS using each MS LRU mapping information, confirms the UL monitoring interval using the UL monitoring interval information, and monitors the UL of a corresponding MS in the UL monitoring interval in step 1007. That is, the femto BS attempts to receive the UL monitoring header from the MS in an operating FA1 of the MS.

In step 1009, the femto BS determines whether it successfully receives the UL signal (i.e., the UL monitoring header) for the MS. For example, the success or failure of the UL signal reception may be determined by determining whether the UL signal quality (e.g., RSSI and CINR) is greater than a reference value.

When the femto BS successfully receives the UL signal of the MS in step 1009, the femto BS determines the received signal strength of the UL signal of the MS, and determines an attenuation degree of the UL signal using the determined received signal strength and the transmission power value of the MS received through the MS transmission power information message from the macro BS in step 1011. Herein, the attenuation degree of the UL signal may be determined as a difference between the transmission power value of the MS and the received signal strength.

In step 1013, the femto BS determines whether the determined attenuation of the UL signal is less than the reference value.

When the determined attenuation of the UL signal is less than the reference value in step 1013, the femto BS determines the success of the UL monitoring and transmits the UL monitoring report message informing of the UL monitoring success to the macro BS over the backbone network in step 1015. The UL monitoring report message may include an MS ID and a UL monitoring indicator. The UL monitoring indicator indicates the success or the failure of the UL monitoring on an MS UL monitoring header of the femto BS.

In contrast, when the UL signal of the MS is not successfully received in step 1009 or when the determined attenuation of the UL signal is not less than the reference value in step 1013, the femto BS determines the failure of the UL monitoring and transmits the UL monitoring report message informing of the UL monitoring failure to the macro BS over the backbone network in step 1017.

Thereafter, the femto BS ends the process.

As set forth above, in a wireless communication system including a macro BS and a femto BS, the macro BS controls UL monitoring of the femto BS, the femto BS monitors a UL signal of the MS and reports a UL monitoring result to the macro BS under the control, the macro BS requests the MS to scan based on the report, and the MS detects a neighbor femto BS by scanning the femto BSs as requested. As the MS scans to detect the neighbor femto BS, unnecessary scanning may be minimized. Therefore, the time taken to scan may be minimized, real-time service may be seamlessly offered to the MS, and the system efficiency may be increased.

While the invention has been shown and described with reference to certain exemplary embodiments thereof, it will be understood by those skilled in the art that various changes in forms and details may be made therein without departing from the spirit and scope of the invention as defined by the appended claims and their equivalents.

What is claimed is:

1. An operating method of a femto Base Station (BS) to support a Mobile Station (MS) for detecting the femto BS in a wireless communication system comprising a macro BS and the femto BS, the method comprising:
   receiving a request, from the macro BS, to monitor an UpLink (UL) signal of the MS permissible by the femto BS to access; and
   monitoring the UL signal of the MS permissible to access.

2. The method of claim 1, wherein the receiving of the request to monitor the UL signal receives a UL monitoring request message comprising UL resource allocation information of the MS, from the macro BS, and
   the monitoring of the UL signal of the MS monitors UL traffic transmitted by the MS during a UL traffic transmission interval of the MS using the UL resource allocation information.

3. The method of claim 2, wherein the UL monitoring request message comprises at least one of an MS ID, an operating Frequency Allocation (FA) of the MS, the UL resource allocation information of the MS, and a transmission power value of the MS.

4. The method of claim 1, further comprising:
   determining at least one of a reception quality of the UL signal, one of reception success and failure of the UL signal, and an attenuation degree of the UL signal through the monitoring;
   determining one of success and failure of the monitoring on the MS based on the at least one of the reception quality of the UL signal, the one of reception success and failure of the UL signal, and the attenuation degree of the UL signal; and
   transmitting a UL monitoring report message reporting the determined one of success and failure of the monitoring on the MS, to the macro BS,
   wherein the attenuation degree of the UL signal is determined as a difference between a received signal strength determined from the UL signal of the MS and a transmission power value of the MS.

5. The method of claim 1, wherein the receiving of the request to monitor the UL signal comprises:
   receiving a UL monitoring configuration information message comprising information relating to a UL monitoring interval of the MS, from the macro BS; and
   receiving an MS transmission power information message comprising a transmission power value of the MS, from the macro BS,
   wherein the monitoring of the UL signal of the MS monitors a UL monitoring header transmitted from the MS during the UL monitoring interval of the MS.

6. The method of claim 5, wherein the UL monitoring configuration information message comprises at least one of a UL monitoring frame transmission cycle, a frame offset, UL monitoring subframe allocation information, and MS Logical Resource Unit (LRU) mapping information.

7. The method of claim 1, wherein the femto BS comprises a Closed Subscriber Group (CSG) femto BS.

8. An operating method of a macro Base Station (BS) to support a Mobile Station (MS) for detecting a femto BS in a wireless communication system comprising the macro BS and the femto BS, the method comprising:
   requesting to monitor an UpLink (UL) signal of the MS permissible by the femto BS to access, to the femto BS; and
   receiving a UL monitoring report message reporting one of success and failure of the monitoring of the MS, from the femto BS.

9. The method of claim 8, wherein the requesting to monitor the UL signal transmits a UL monitoring request message comprising UL resource allocation information of the MS, to the femto BS when a UL resource is allocated to the MS, and
   the monitoring of the MS is performed by the femto BS with respect to UL traffic transmitted by the MS during a UL traffic transmission interval of the MS using the UL resource allocation information.

10. The method of claim 9, wherein the UL monitoring request message comprises at least one of an MS ID, an operating Frequency Allocation (FA) of the MS, the UL resource allocation information of the MS, and a transmission power value of the MS.

11. The method of claim 8, further comprising:
    transmitting a Mobile Scanning Request (MOB_SCN-REQ) message comprising information relating to the femto BS successfully monitoring the MS, to the MS,
    wherein the MOB_SCN-REQ message comprises at least one of a scanning start frame, a scanning duration, a femto BS ID, an operating FA of the femto BS, and a preamble index of the femto BS.

12. The method of claim 8, wherein the requesting to monitor the UL signal comprises:
    transmitting a UL monitoring configuration information message comprising information relating to a UL monitoring interval of the MS, to the femto BS; and
    transmitting an MS transmission power information message comprising a transmission power value of the MS, to the femto BS,
    wherein the monitoring of the MS is performed by the femto BS with respect to a UL monitoring header transmitted from the MS during the UL monitoring interval of the MS.

13. The method of claim 12, wherein the UL monitoring configuration information message comprises at least one of a UL monitoring frame transmission cycle, a frame offset, UL monitoring subframe allocation information, and MS Logical Resource Unit (LRU) mapping information.

14. The method of claim 12, further comprising:
    transmitting the UL monitoring configuration information message to the MS; and
    receiving the UL monitoring header from the MS in the UL monitoring interval of the MS.

15. The method of claim 8, wherein the femto BS comprises a Closed Subscriber Group (CSG) femto BS.

16. An apparatus supporting a Mobile Station (MS) for detecting a femto Base Station (BS) in a wireless communication system, the apparatus comprising:
    a macro BS for requesting the femto BS to monitor an UpLink (UL) signal of an MS permissible by the femto BS to access; and
    the femto BS for monitoring the UL signal of the MS permissible to access.

17. The apparatus of claim 16, wherein the macro BS transmits a Mobile Scanning Request (MOB_SCN-REQ)

message comprising information relating to a the femto BS successfully monitoring the MS, to the MS,
wherein the MOB_SCN-REQ message comprises at least one of a scanning start frame, a scanning duration, a femto BS ID, an operating FA of the femto BS, and a preamble index of the femto BS.

18. The apparatus of claim 17, further comprising the MS for scanning the femto BS using the information relating to the femto BS successfully monitoring the MS.

19. The apparatus of claim 16, wherein, when a UL resource is allocated to the MS, the macro BS transmits a UL monitoring request message comprising UL resource allocation information of the MS, to the femto BS, and
the femto BS monitors UL traffic transmitted from the MS in a UL traffic transmission interval of the MS using the UL resource allocation information.

20. The apparatus of claim 19, wherein the UL monitoring request message comprises at least one of an MS ID, an operating FA of the MS, the UL resource allocation information of the MS, and a transmission power value of the MS.

21. The apparatus of claim 16, wherein the macro BS transmits a UL monitoring configuration information message comprising information relating to a UL monitoring interval of the MS, and an MS transmission power information message comprising a transmission power value of the MS, to the femto BS, and
the femto BS monitors a UL monitoring header transmitted from the MS in the UL monitoring interval of the MS.

22. The apparatus of claim 21, wherein the UL monitoring configuration information message comprises at least one of a UL monitoring frame transmission cycle, a frame offset, UL monitoring subframe allocation information, and MS Logical Resource Unit (LRU) mapping information.

23. The apparatus of claim 21, further comprising:
the MS for generating and transmitting a UL monitoring header to the macro BS in the UL monitoring interval,
wherein the macro BS transmits a UL monitoring configuration information message comprising information relating to the UL monitoring interval of the MS, to the MS.

24. The apparatus of claim 16, wherein the femto BS determines at least one of a reception quality of the UL signal, one of reception success and failure of the UL signal, and an attenuation degree of the UL signal through the monitoring,
determines one of success and failure of the monitoring on the MS based on the at least one of the reception quality of the UL signal, the one of reception success and failure of the UL signal, and the attenuation degree of the UL signal, and
transmits a UL monitoring report message reporting the determined one of success and failure of the monitoring on the MS, to the macro BS,
wherein the attenuation degree of the UL signal is determined as a difference between a received signal strength determined from the UL signal of the MS and a transmission power value of the MS.

25. The apparatus of claim 16, wherein the femto BS comprises a Closed Subscriber Group (CSG) femto BS.

* * * * *